(12) United States Patent
Alajbegovic (10) Patent No.: US 7,891,670 B2
(45) Date of Patent: Feb. 22, 2011

(54) MULTI-DIRECTIONAL SHAFT SEAL

(75) Inventor: Vahidin Alajbegovic, Northville, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 553 days.

(21) Appl. No.: 12/024,656

(22) Filed: Feb. 1, 2008

(65) Prior Publication Data

US 2009/0194952 A1    Aug. 6, 2009

(51) Int. Cl.
*F16J 15/32* (2006.01)
(52) U.S. Cl. .................... 277/559; 277/549
(58) Field of Classification Search ................. 277/309, 277/549, 551, 559
See application file for complete search history.

(56) References Cited

U.S. PATENT DOCUMENTS

| | | | |
|---|---|---|---|
| 3,497,225 A | 2/1970 | Workman | |
| 3,527,465 A | 9/1970 | Guinard | |
| 3,638,957 A | 2/1972 | Marsi | |
| 3,923,315 A | 12/1975 | Hadaway et al. | |
| 3,934,888 A | 1/1976 | Lutz | |
| 3,984,113 A | 10/1976 | Bentley | |
| 3,988,078 A | 10/1976 | Barker | |
| 4,008,014 A | 2/1977 | Staebler | |
| 4,055,106 A | 10/1977 | Frey | |
| 4,084,826 A | 4/1978 | Vossieck et al. | |
| 4,111,436 A | 9/1978 | Yazawa et al. | |
| 4,118,856 A | 10/1978 | Bainard et al. | |
| 4,119,324 A | 10/1978 | Denton et al. | |
| 4,132,421 A | 1/1979 | Corsi et al. | |
| 4,256,208 A | 3/1981 | Najer et al. | |
| 4,399,998 A * | 8/1983 | Otto .......................... 277/552 | |
| 4,451,050 A | 5/1984 | Repella | |
| 4,487,561 A | 12/1984 | Eiermann et al. | |
| 4,501,431 A | 2/1985 | Peisker et al. | |
| 4,610,319 A * | 9/1986 | Kalsi .......................... 175/371 | |
| 4,705,277 A | 11/1987 | Repella | |
| 4,822,058 A | 4/1989 | Butler et al. | |
| 4,845,828 A | 7/1989 | Reed | |
| 5,002,289 A | 3/1991 | Yasui et al. | |
| 5,009,583 A | 4/1991 | Carlsson et al. | |
| 5,118,267 A | 6/1992 | Dollhopf et al. | |
| 5,190,440 A | 3/1993 | Maier et al. | |
| 5,201,531 A | 4/1993 | Lai | |
| 5,498,007 A | 3/1996 | Kulkarni et al. | |
| 5,664,787 A | 9/1997 | Fuse et al. | |
| 5,692,757 A | 12/1997 | Straub | |

(Continued)

FOREIGN PATENT DOCUMENTS

EP        0128645        12/1984

(Continued)

*Primary Examiner*—Shane Bomar
*Assistant Examiner*—Gilbert Y Lee
(74) *Attorney, Agent, or Firm*—Ronald W. Wangerow, Esq.; Harness, Dickey & Pierce, P.L.C.

(57) ABSTRACT

A dynamic seal provides for the return of captured lubricant to the lubricant side regardless of the direction of rotation between the seal and the shaft. The seal uses bi-directional pumping elements to facilitate the hydrodynamic pumping of the captured lubricant in response to relative rotation. The seal includes a valve portion that can change a pumping rate of particular pumping elements such that more lubricant is pumped toward the lubricant side than the non-lubricant side.

27 Claims, 9 Drawing Sheets

U.S. PATENT DOCUMENTS

| | | | |
|---|---|---|---|
| 5,755,446 | A | 5/1998 | Dean et al. |
| 5,791,658 | A | 8/1998 | Johnston |
| 5,921,555 | A * | 7/1999 | Johnston ............... 277/559 |
| 6,168,164 | B1 * | 1/2001 | Toth et al. ............... 277/559 |
| 6,170,083 | B1 | 1/2001 | Adl-Tabatabai |
| 6,170,834 | B1 | 1/2001 | Vogt et al. |
| 6,350,732 | B1 | 2/2002 | Moore et al. |
| 6,357,325 | B1 | 3/2002 | Vogt et al. |
| 6,400,917 | B2 | 6/2002 | Nakazato et al. |
| 6,409,177 | B1 | 6/2002 | Johnston |
| 6,420,801 | B1 | 7/2002 | Seefeldt |
| 6,428,013 | B1 | 8/2002 | Johnston et al. |
| 6,688,603 | B2 * | 2/2004 | vom Schemm ............ 277/553 |
| 6,705,617 | B2 * | 3/2004 | Mellet et al. ............... 277/559 |
| 6,726,213 | B2 | 4/2004 | Wang et al. |
| 6,729,624 | B1 | 5/2004 | Johnston |
| 7,044,470 | B2 | 5/2006 | Zheng |
| 2007/0187904 | A1 | 8/2007 | Berdichevsky |
| 2007/0187905 | A1 | 8/2007 | Berdichevsky |

FOREIGN PATENT DOCUMENTS

| | | |
|---|---|---|
| EP | 0286211 B1 | 10/1988 |
| EP | 0432287 B1 | 6/1991 |
| EP | 0447766 A2 | 9/1991 |
| EP | 0564153 B1 | 10/1993 |
| EP | 0657641 A2 | 6/1995 |
| EP | 0684413 B1 | 11/1995 |
| EP | 0771398 B1 | 5/1997 |
| EP | 0792426 B1 | 9/1997 |
| EP | 0879977 B1 | 11/1998 |
| EP | 1026428 A2 | 8/2000 |
| WO | 9602777 | 2/1996 |

* cited by examiner

MULTI-DIRECTIONAL SHAFT SEAL

FIELD

The present disclosure relates to dynamic seals, and more particularly, to a dynamic seal having bi-directional pumping elements.

BACKGROUND

The statements in this section merely provide background information related to the present disclosure and may not constitute prior art.

Rotary shaft seals are used in many industries, such as the automotive industry, and in many applications that can require a symmetrically functioning dynamic seal (i.e., the seal must function effectively in both directions of shaft rotation). For example, such seals are used on transmissions, pinions, gears, axles, etc. The seal typically is used to retain a fluid and has two separate sides. The fluid can be any fluid desired to be retained by the seal as dictated by the application within which the seal is utilized. The fluid can be a lubricant. By way of non-limiting example, the fluid can be oil, water, chemicals, slurries, and the like. The fluid being retained by the seal is hereinafter referred to collectively as "lubricant." A first side of the seal is exposed to the air or outside environment and is referred to herein as the "non-lubricant side." A second side of the seal is a sealed fluid side that is exposed to the lubricant and is used to retain the lubricant on the second side and is referred to herein as the "lubricant side." The lubricant may, however, leak from the lubricant side to the non-lubricant side due to the interaction of a contact surface of the seal with the shaft. Pumping elements disposed on the contact surface of the seal can capture the leaked lubricant and hydro-dynamically pump the captured lubricant across the contact surface and back to the lubricant side due to relative rotation between the seal and the shaft about which the seal is disposed.

Typically, the pumping elements are helical channels that spiral around the shaft. For the pumping action to work in both rotational directions of the shaft, some channels spiral around the shaft in a first orientation and pump lubricant toward the lubricant side when the shaft rotates in a first direction, and some channels spiral around the shaft in a second orientation and pump lubricant toward the lubricant side when the shaft rotates in a second direction. Thus, for a particular direction of shaft rotation, only one set of channels actively pumps captured lubricant back to the lubricant side. The other set of channels, however, may also capture lubricant and pump the captured lubricant further toward the non-lubricant side. Thus, it would be advantageous to reduce or eliminate the propensity for one of the sets of channels to pump captured lubricant further toward the non-lubricant side while allowing the other set of channels to pump captured lubricant to the lubricant side regardless of the direction of shaft rotation.

SUMMARY

A dynamic seal according to the present teachings advantageously provides for the return of captured lubricant to the lubricant side regardless of the direction of the relative rotation between the seal and the shaft. The seal uses bi-directional pumping elements to facilitate the hydrodynamic pumping of the captured lubricant in response to the relative rotation. The seal has a valve portion that can change a pumping rate of particular pumping elements such that more lubricant is pumped toward the lubricant side than the non-lubricant side.

In one aspect of the present teachings, a bi-directional, dynamic seal has a lubricant side and a non-lubricant side. There is a sealing portion with an active surface communicating with the non-lubricant side and operable to engage with the shaft. A plurality of pumping elements extends along the active surface. The pumping elements capture lubricant and pump the captured lubricant to at least one of the lubricant side and the non-lubricant side due to relative rotation between the shaft and the pumping elements. A valve portion is displaceable relative to the active surface and is operable to engage with the shaft. Rotation of the shaft rotationally displaces the valve portion relative to the active surface such that the displaced valve portion changes a pumping rate of at least one of the pumping elements.

In another aspect of the present teachings, a bi-directional, dynamic seal has an annular body with a lubricant side, a non-lubricant side, a central opening within which a shaft can be disposed, and a sealing portion having an active surface engaging with and sealing against a shaft disposed in the central opening. There is a first set of pumping channels in the active surface which is operable to capture lubricant and pump captured lubricant toward the lubricant side when the shaft rotates in a first direction and toward the non-lubricant side when the shaft rotates in a second direction opposite to the first direction. A second set of pumping channels in the active surface is operable to capture lubricant and pump captured lubricant toward the non-lubricant side when the shaft rotates in the first direction and toward the lubricant side when the shaft rotates in the second direction. A valving member is moveable relative to the active surface. The valving member inhibits pumping of captured lubricant in the second set of channels when the shaft rotates in the first direction and inhibits pumping of captured lubricant in the first set of channels when the shaft rotates in the second direction.

A method according to the present teachings includes capturing lubricant with pumping elements extending along an active surface of the seal. The captured lubricant is pumped toward the lubricant side with a first set of pumping elements when the shaft rotates in a first direction. Captured lubricant is pumped toward the lubricant side with a second set of pumping elements when the shaft is rotated in a second direction differing from the first direction. The second set of pumping elements is different than the first set. The pumping rate of the second set of pumping elements is reduced when the shaft is rotated in the first direction such that a pumping rate of the first set of pumping elements is greater than a pumping rate of the second set of pumping elements. A pumping rate of the first set of pumping elements is reduced when the shaft rotates in the second direction such that a pumping rate of the second set of pumping elements is less than a pumping rate of the first set of pumping elements.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present teachings in any way.

DETAILED DESCRIPTION

The following description of the preferred embodiments is merely exemplary in nature and is not intended to limit the invention, its application, or its uses. In describing the various teachings herein, reference indicia are used. It should be understood that throughout the drawings, corresponding reference numerals indicate like or corresponding parts and features (e.g., 22, 122, 222, etc.).

Figure 1:
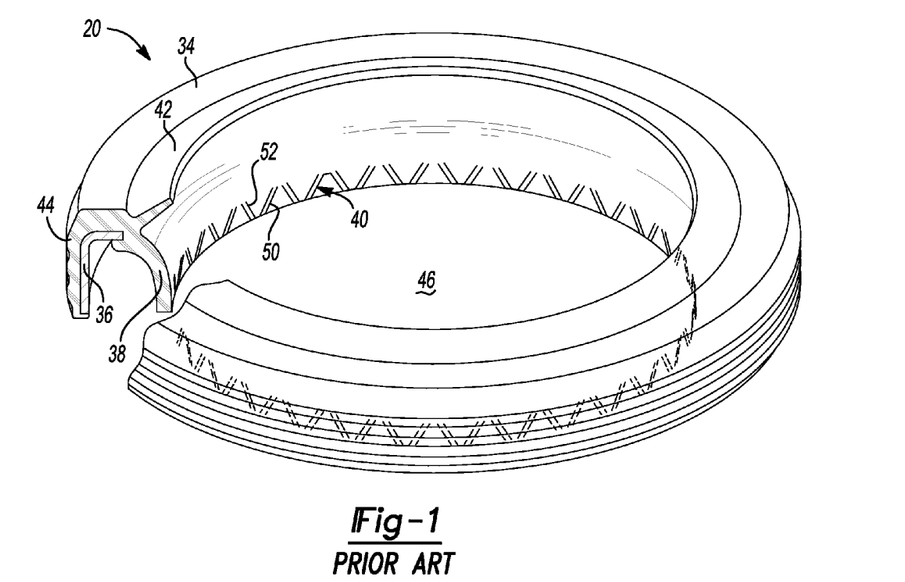
FIG. 1 is a perspective view of a simplified prior art seal having pumping elements.
Figure 2:
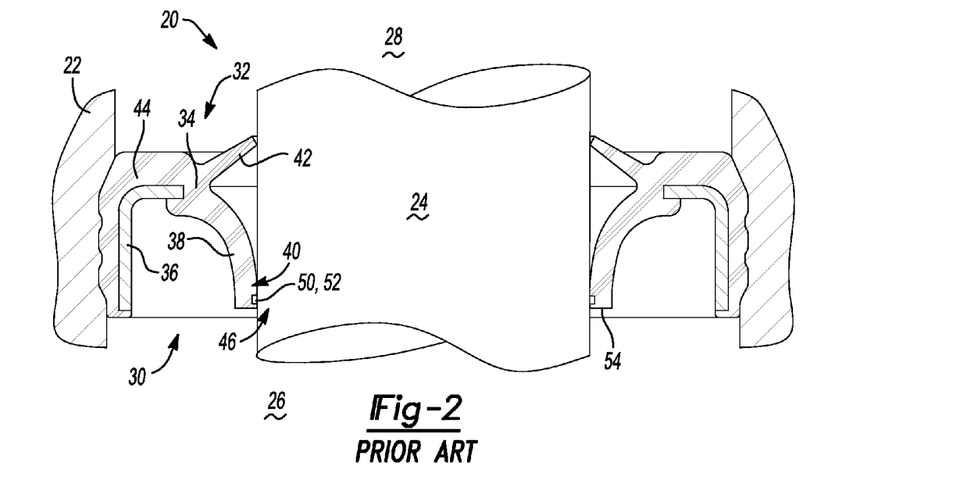
FIG. 2 is a cross-sectional view of the simplified prior art seal of FIG. 1.

Referring to FIGS. 1 and 2, a symmetrically functioning prior art dynamic seal 20 is shown. The annularly shaped seal 20 is disposed in a fixed housing 22 in a manner which is well known in the art and engages a rotary shaft 24. A lubricant side 26 and a non-lubricant side 28 of seal 20 generally segregate a first chamber 30 of fixed housing 22 from an exterior or a second chamber 32 of fixed housing 22.

Seal 20 includes an annularly shaped body portion 34 mounted to an annular insert 36. Body portion 34 includes a primary sealing portion 38 having an active surface 40 that directly engages and seals against shaft 24. Body portion 34 also includes a secondary sealing portion 42 whose lip seals against shaft 24. Body portion 34 also includes a peripheral leg 44 that extends around insert 36 and seals against fixed housing 22 due to compression between fixed housing 22 and insert 36.

Primary and secondary sealing portions 38, 42 form a central opening 46 within which shaft 24 is disposed. Primary sealing portion 38 can have more surface contact with shaft 24 than secondary sealing portion 42. Active surface 40 engages shaft 24 and includes a plurality of pumping elements 50, 52. Pumping elements 50, 52 can take the form of grooves, as shown, or ridges that extend radially inwardly from active surface 40. A first set of pumping elements 50 extends curvalinearly in a first orientation as they extend axially away from lubricant side 26. A second set of pumping elements 52 extends curvalinearly in a second orientation as they extend axially away from lubricant side 26. Pumping elements 50, 52 are operable to capture lubricant that leaks past lip 54 of primary sealing portion 38 and pump the captured lubricant back toward lubricant side 26. The differing orientations of first and second pumping elements 50, 52 allow the pumping elements to pump the captured lubricant back to lubricant side 26 regardless of the direction of rotation of shaft 24. When shaft 24 rotates in a first direction, the first set of pumping elements 50 are operable to pump captured lubricant back toward lubricant side 26, while second set of pumping elements 52 are operable to pump captured lubricant back toward lubricant side 26 when shaft 24 is rotating in a second direction. Thus, pumping elements 50, 52 are bi-directional pumping elements.

Both sets of pumping elements 50, 52 are not actively pumping captured lubricant back toward lubricant side 26 for a particular direction of rotation of shaft 24. Rather, the non-active set of pumping elements can cause lubricant captured therein to be slung further toward non-lubricant side 28, thus reducing the effectiveness of the pumping action of the active set of pumping elements. To reduce the adverse effect of the non-active set of pumping elements, a seal 120 according to present teachings utilizes a valving member to reduce the pumping rate of the non-active pumping elements and, in some cases, may seal off the non-active set of pumping elements such that they provide no pumping action when the shaft is rotating in a direction that does not correspond to those pumping elements being active, as described below.

Figure 3:
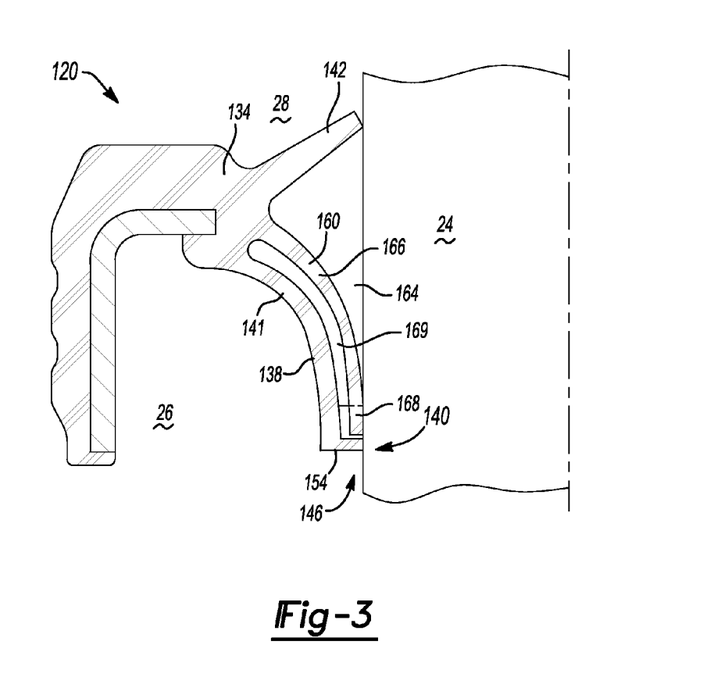
FIG. 3 is a cross-sectional view of a first embodiment of a seal in accordance with the present teachings on a shaft.
Figure 4:
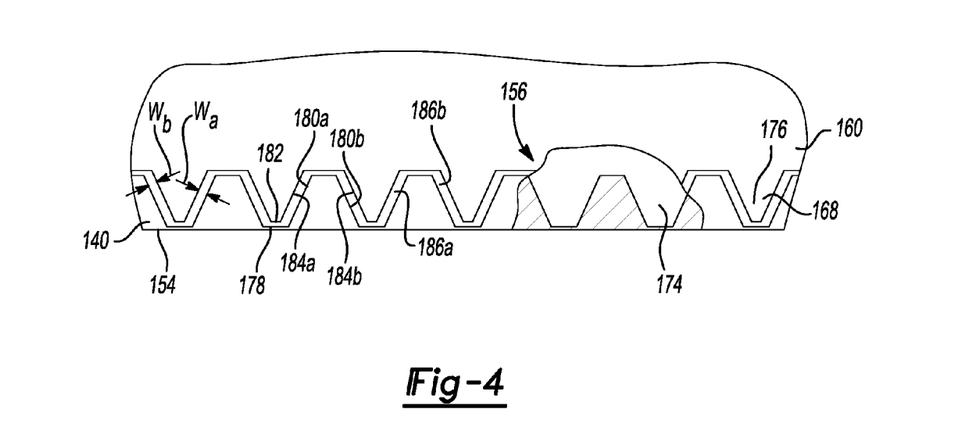
FIG. 4 is fragmented view of a sealing portion and a valve portion of the seal of FIG. 3 in a theoretical flattened condition and having a cut-away section.
Figure 6:
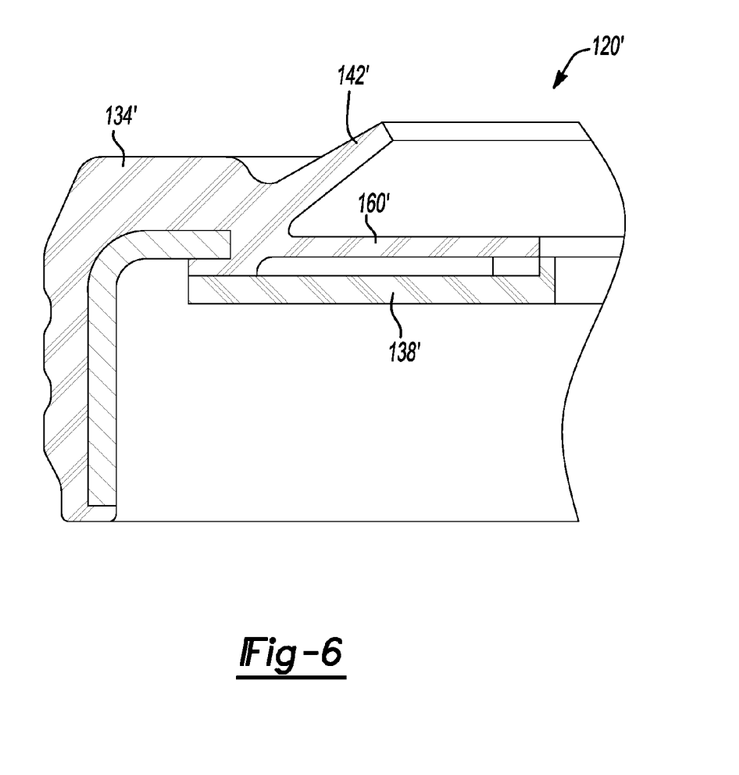
FIG. 6 is a fragmented cross-sectional view of an alternate construction for the seal of FIG. 3.

Referring now to FIGS. 3 and 4, a first embodiment of a seal 120 according to the present teachings is shown. Seal 120 is similar to prior art seal 20 with the primary difference being the configuration of the pumping elements on the active face and the addition of a valving portion 160. Valving portion 160 extends from body portion 134 between primary and secondary sealing portions 138, 142. Primary and secondary sealing portions 138, 142 and valving portion 160 can be unitary and integrally formed with body portion 134, such as by a direct molding process. Alternatively, as shown in FIG. 6, secondary sealing portion 142' and valving portion 160' of seal 120' can be unitary and integrally formed with body portion 134', while primary sealing portion 138' is separately formed. Primary sealing portion 138' can be formed, such as through a direct molding process, and bonded to body portion 134'.

Referring now to FIGS. 3-4 and 7-8, primary sealing portion 138 includes a non-contacting body portion 141 and an active surface 140 that at least partially engages shaft 24. Active surface 140 defines a seal lip 154 that engages shaft 24 at lubricant side 26. Valve portion 160 extends from body portion 134 and is disposed in gap 164 between primary and secondary sealing portions 138, 142. Valving portion 160 includes a non-contacting body portion 166 and a contacting portion 168 that contacts shaft 24. Preferably, a gap 169 is maintained between body portion 166 of valving portion 160 and body portion 141 of primary sealing portion 138.

Pumping elements 156 of seal 120 are formed by features on both primary sealing portion 138 and valving portion 160. Specifically, a plurality of recesses 174 are coined, cut, or otherwise formed into active surface 140, while contacting portion 168 of valving portion 160 includes a plurality of teeth 176, which are configured to nest within recesses 174. Recesses 174 and teeth 176 can be generally truncated triangular in shape and radially disposed around shaft 24 and can form mating saw-tooth-like patterns, as shown in FIG. 4.

Each recess 174 includes a bottom 178 and a pair of sidewalls 180a,b that extend therefrom toward non-lubricant side 28. Sidewalls 180a extend in a first angular direction (orientation) from bottom 178 along active surface 140, while sidewalls 180b extend in a second angular direction (orientation) from bottom 178 along active surface 140. The different angular directions provide pumping of captured lubricant toward lubricant side 26, regardless of the direction of rotation of shaft 24, as described below.

Each tooth 176 has a top 182 and a pair of sidewalls 184a,b that extend therefrom toward non-lubricant side 28 along contacting portion 168. Sidewalls 184a extend in the first angular direction (orientation) generally parallel with sidewalls 180a, while sidewalls 184b extend in the second angular direction (orientation), generally parallel with sidewalls 180b.

When in a relaxed neutral state, teeth 176 are generally centered within recesses 174 such that the width $W_a$ between sidewalls 180a, 184a is generally the same as the width $W_b$ between sidewalls 180b, 184b. The gaps between sidewalls 180a, 184a form a first plurality of pumping channels 186a, while the gaps between sidewalls 180b, 184b form a second plurality of pumping channels 186b. Pumping channels 186a are operable to capture lubricant that leaks past seal lip 154 and direct it back to lubricant side 26 when shaft 24 rotates in a first direction. Pumping elements 186b are operable to capture lubricant that leaks past seal lip 154 and direct it back to lubricant side 26 when shaft 24 rotates in a second direction opposite to that of the first direction. As a result, pumping channels 186a, 186b can capture lubricant that leaks past seal lip 154 and direct it back to lubricant side 26 regardless of the direction of rotation of shaft 24.

Seal lip 154 may engage shaft 24 to form a static dam that generally block channels 186a, 186b during a static condition of shaft 24 and inhibits lubricant from leaking from lubricant side 26 to non-lubricant side 28. When shaft 24 rotates, lubricant can leak toward non-lubricant side 28 and across seal lip 154. Lubricant leakage across seal lip 154 could be uncontrolled or could be controlled by designing seal lip 154 to allow lubricant leakage at a predetermined leakage rate.

Figure 5:
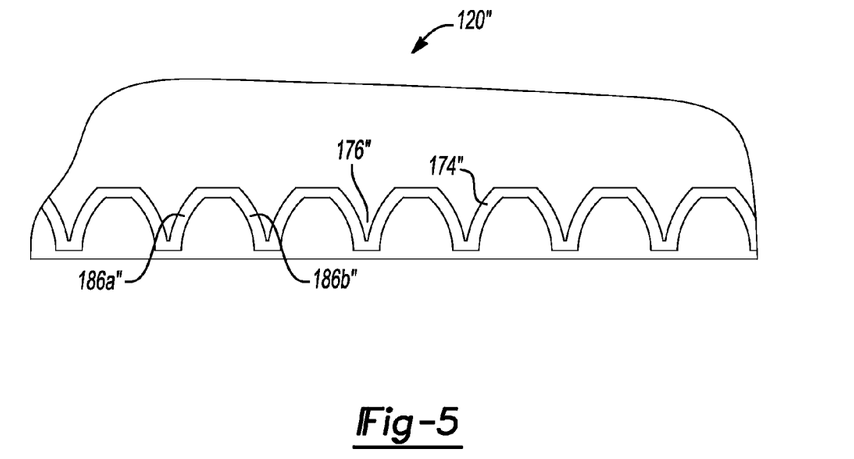
FIG. 5 is a fragmented view similar to FIG. 4, illustrating an alternate embodiment of a sealing portion and a valve portion according to the present teachings.

Seal 120 is designed to capture the lubricant that leaks across seal lip 154 and to pump the captured lubricant back into lubricant side 26. Specifically, valving portion 160 and active surface 140 work in combination through the interaction of recesses 174 and teeth 176 to adjust the configuration of pumping channels 186a, 186b to provide a pumping action that directs the captured lubricant back into lubricant side 26, as described below. As an alternative, as shown in FIG. 5, a seal 120" can be provided with recesses 174" and teeth 176" having curvalinear channels 186a" and 186b" to provide a pumping action that directs the captured lubricant back into lubricant side 26.

To capture and pump the leaked lubricant back to lubricant side 26, contacting portion 168 of valve portion 160 and active surface 140 of primary sealing portion 138 can engage shaft 24 and rotationally deflect relative to body portion 134 due to contact friction with shaft 24 as shaft 24 rotates. Valve portion 160 and active surface 140 are secured to rotationally fixed body portion 134 to elastically resist rotational deflection. Valve portion 160 may engage with active surface 140 to resist rotational deflection. Respective rotational deflections of valve portion 160 and active surface 140 may be designed/controlled to create relative rotational movement therebetween. The person skilled in the art will appreciate that the relative rotational movement is dependent on many inter-related design factors for primary sealing portion 138 and valve portion 160, such as contact loads from shaft 24, shaft surface friction, which can further depend on shaft speed and diameter, contact friction between valve portion 160 and active surface 140, structural geometry, material rigidity, etc. The skilled person will further appreciate that any combination of these factors can be modified for a particular shaft and seal configuration to advantageously realize the benefits of the present teachings.

The relative rotational movement between valve portion 160 and active surface 140 may change the configuration of the pumping elements 156 on active surface 140 to advantageously alter the pumping rate. In some embodiments, for example, valve portion 160 can change the cross-sectional area of one or both of channels 186a, 186b. In some embodiments, valve portion 160 can inhibit or block one or both of channels 186a, 186b.

The dynamics of pumping lubricant back into lubricant side 26 depends on numerous factors, including a pumping rate of captured lubricant to lubricant side 26 and a pumping rate of captured lubricant to non-lubricant side 28, hereinafter referred to as first pumping rate and second pumping rate, respectively. Preferably, a steady state operation is realized in which pumping elements 156 create a positive net pumping rate (i.e., first pumping rate is greater than second pumping rate) regardless of a rotational direction of shaft 24. A benefit of such a construction is that the net positive pumping rate can generally prevent lubricant buildup on non-lubricant side 28 of seal 120. In some embodiments, another benefit is provided by maintaining active surface 140 in a lubricated state by permitting some pumping elements 156 to draw lubricant maintained in first chamber 30 of housing 22 through active surface 140 while other pumping elements 156 simultaneously return lubricant to the lubricant side 26 to prevent lubricant buildup on non-lubricant side 28. Maintaining active surface 140 in a lubricated state may increase durability and effectiveness of seal 120. In some embodiments, another provided benefit is that pumping elements 156 may return lubricant that may leak into and accumulate on non-lubricant side 28 of seal 120 during a static condition of shaft 24.

Figure 7A:
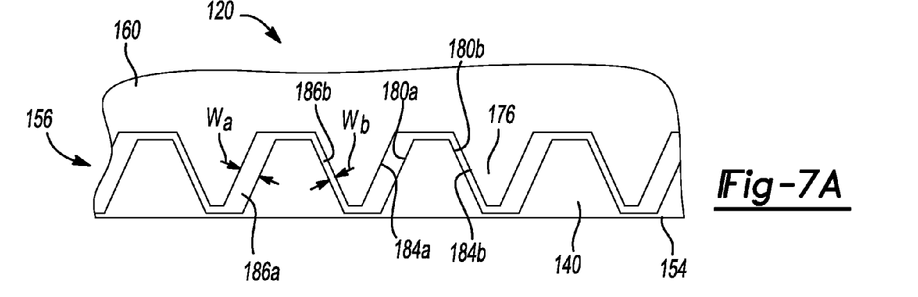
FIGS. 7A-B are fragmented views of the sealing and valve portions of the seal of FIG. 3 in a theoretical flattened condition showing relative movement between the sealing and valve portions of the seal for a first direction of shaft rotation.
Figure 7B:
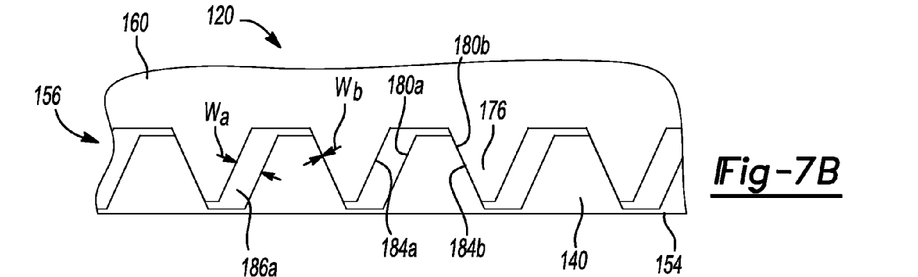
Figure 8A:
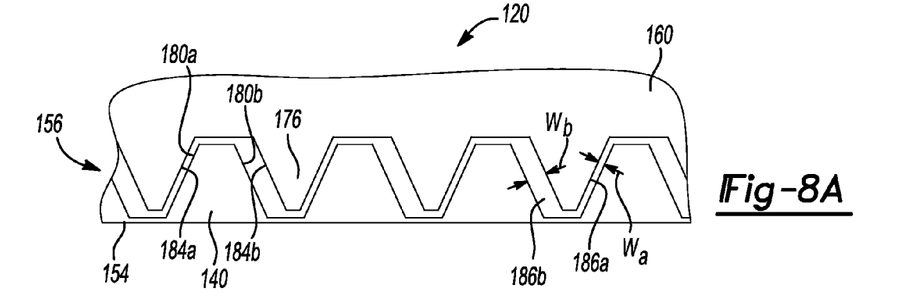
FIGS. 8A-B are fragmented views of the sealing and valve portions of the seal of FIG. 3 in a theoretical flattened condition showing relative movement between the sealing and valve portions of the seal for a second direction of shaft rotation.
Figure 8B:
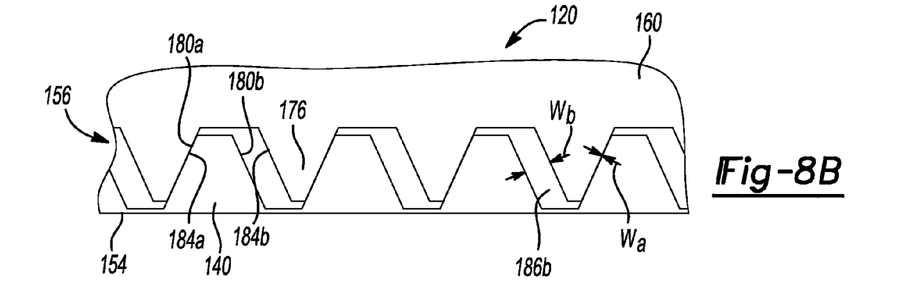

In operation, rotation of shaft 24 can cause valve portion 160 to rotate relative to active surface 140 and change the widths $W_a$, $W_b$ of channels 186a, 186b, as shown in FIGS. 7 and 8. More particularly, when shaft 24 rotates in a first direction, as shown in FIG. 7A, sidewall 184b of teeth 176 moves toward sidewall 180b of recess 174, thereby reducing the width $W_b$. Simultaneously, sidewalls 184a of teeth 176 move away from sidewalls 180a of recesses 174, thereby increasing the width $W_a$ therebetween. This change in widths $W_a$, $W_b$ alters the cross-sectional areas of channels 186a, 186b, thereby altering the pumping characteristics such that channels 186b (having the smaller reduced width) have a reduced pumping rate, while channels 186a (having the larger increased width) have a greater pumping rate. The net result is that for this first direction of rotation of shaft 24, pumping channels 186a have a greater pumping rate than pumping channels 186b. Therefore, a net positive pumping rate is achieved and the captured lubricant is returned to lubricant side 26 at a faster rate (by pumping channels 186a) than lubricant is pumped toward non-lubricant side 28 (by pumping channels 186b).

In some instances, as shown in FIG. 7B, the rotation of valving portion 160 relative to active surface 140 can be such that sidewalls 184b of teeth 176 engage with sidewalls 180b of recesses 174, thereby reducing the width $W_b$ therebetween (and the associated cross-sectional area) essentially to zero while maximizing the width $W_a$ (and the associated cross-sectional area) between sidewalls 184a, 180a. As a result, the pumping rate of channels 186b can be effectively reduced to zero, while the pumping rate of channels 186a is maximized, thereby resulting in a further increase in the net positive pumping rate.

Referring now to FIGS. 8A and B, the effects of rotation of shaft 24 in a second direction opposite the first direction is shown. In particular, valving portion 160 rotates relative to active surface 140 such that sidewalls 184b move away from sidewalls 180b, thereby increasing width $W_b$ (and the associated cross-sectional area), while sidewalls 184a approach sidewalls 180a, thereby reducing width $W_a$ (and the associated cross-sectional area), as shown in FIG. 8A. As a result, the pumping rate of pumping channels 186b is increased, while the pumping rate of pumping channels 186a is decreased. Therefore, rotation of shaft 24 in the second direction can provide a net positive pumping rate wherein pumping channels 186b direct captured lubricant back to lubricant side 26 at a faster rate than pumping channels 186a direct captured lubricant toward non-lubricant side 28.

In some instances, as shown in FIG. 8B, the relative rotation between valving portion 160 and active surface 140 can result in sidewalls 184a contacting sidewalls 180a, thereby reducing the width $W_a$ therebetween (and the associated cross-sectional area) to essentially zero, while maximizing the width $W_b$ (and the associated cross-sectional area) between sidewalls 184b, 180b. As a result, the pumping rate of channels 186b is maximized, while the pumping rate of channels 186a is essentially reduced to zero, thereby resulting in a further increase in the net positive pumping rate.

Thus, the relative rotation between valving portion 160 and active surface 140 due to rotation of shaft 24 can be advantageously utilized to reduce the pumping rate of one set of pumping channels while increasing the pumping rate of the other set of pumping channels, thereby ensuring a net positive pumping result regardless of the rotation of shaft 24. The degree to which valving portion 160 rotates relative to active surface 140 can vary based on the construction of seal 120 and the interaction of these components with shaft 24, as described above. Thus, it should be appreciated that seal 120 can be configured so that pumping channels 186a, 186b are either increased, reduced, or completely sealed due to the relative movement between valving portion 160 and active surface 140, depending upon the particular design, configuration, and operation of seal 120.

The person skilled in the art will appreciate that other channel configurations can be utilized in combination with the subsequent teachings of this disclosure to advantageously affect the pumping rate of the pumping elements. For example, the angles of pumping channels 186a, 186b relative to the rotational axis of shaft 24 could be increased or decreased. For another example, as illustrated in FIG. 5, pumping channels 186a'', 186b'' could be curved channels formed by sides of teeth 176'' and recesses 174'' that form generally helical channels having a variable slope as teeth 176'' and recesses 174'' extend along seal 120''.

Figure 9:
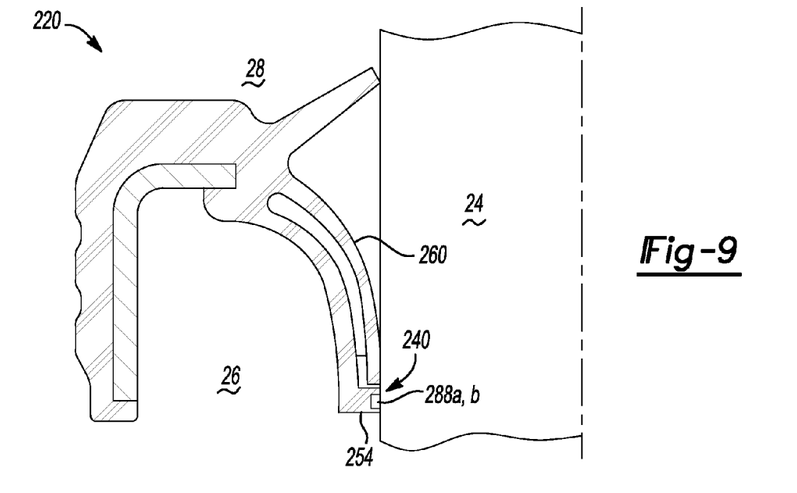
FIG. 9 is a cross-sectional view of a second embodiment of a seal in accordance with the present teachings on a shaft.
Figure 10:
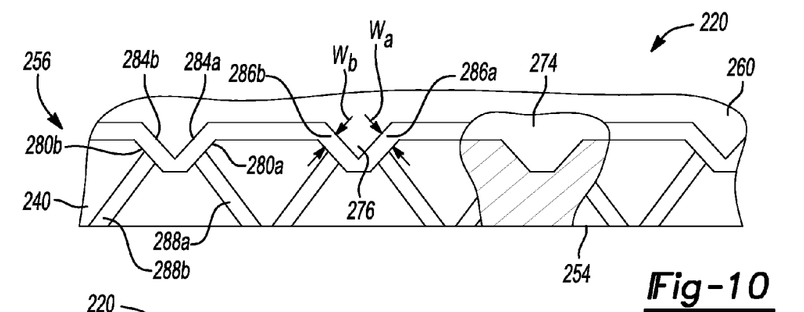
FIG. 10 is a fragmented view of a sealing portion and a valve portion of the seal of FIG. 9 in a theoretical flattened condition and having a cut-away section.

Referring now to FIGS. 9-11, a second embodiment of a seal 220 according to the present teachings is shown. Seal 220 is similar to seal 120 described above and, thus, only differences will be described herein. In seal 220, pumping elements 256 are configured differently than pumping elements 156 utilized in seal 120. In particular, recesses 274 on active surface 240 are axially spaced further away from seal lip 254 than is done in seal 120. As a result, pumping channels 286a, 286b are further spaced away from seal lip 254. Additionally, active surface 240 includes a plurality of pumping channels 288a, 288b that extend from seal lip 254 into pumping channels 286a, 286b, respectively. Pumping channels 288a, 288b form the primary pumping channels through which lubricant is captured and directed back to lubricant side 26. Pumping channels 288a, 288b have dimensions that can remain constant between seal lip 254 and pumping channels 286a, 286b. Additionally, pumping channels 288a, 288b can be open at seal lip 254 such that when shaft 24 is not rotating, lubricant can seep into pumping channels 288a, 288b from lubricant side 26.

One set of pumping channels 288a extends at a third angular direction (orientation) along active surface 240, while the second set of pumping channels 288b extend at a fourth angular direction (orientation) along active surface 240. As a result, one set of pumping channels 288a, 288b can provide a pumping action of captured lubricant back toward lubricant side 26 when shaft 24 rotates in a first direction, while the other set of pumping elements 288a, 288b provides pumping action of captured lubricant back toward lubricant side 26 when shaft 24 rotates in a second direction opposite to the first direction. It should be appreciated that while one set of pumping channels 288a, 288b is operable to pump captured lubricant toward lubricant side 26 for a particular rotation of shaft 24, the other pumping channels 288a, 288b will provide a pumping action of captured lubricant toward non-lubricant side 28.

Figure 11A:
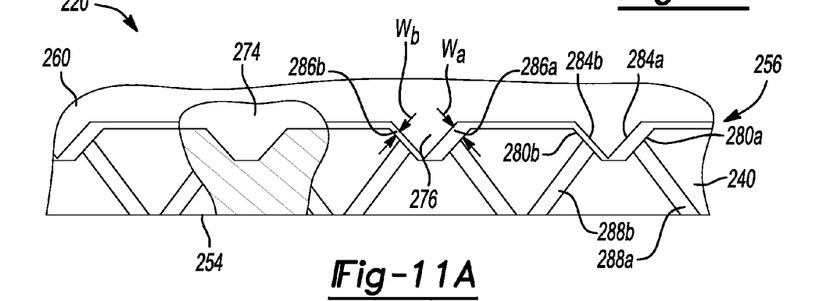
FIGS. 11A-B are fragmented views of the sealing and valve portions of the seal of FIG. 9 in a theoretical flattened condition showing relative movement between the sealing and valve portions of the seal for a first direction of shaft rotation.

To reduce the pumping rate of the pumping channels 288a, 288b that pump captured lubricant toward non-lubricant side 28, valving portion 260 moves relative to active surface 240 during rotation of shaft 24 to minimize and/or prevent flow through the pumping channels 288a, 288b that are pumping captured lubricant toward non-lubricant side 28 due to that particular direction of rotation of shaft 24. In particular, as shown in FIG. 11A, when shaft 24 rotates in a first direction, valving portion 260 moves relative to active surface 240 such that sidewalls 284b of teeth 276 move toward sidewalls 280b of recesses 274. As a result, the width $W_b$ (and the associated cross-sectional area) of pumping channel 286b is reduced and chokes or restricts the flow of lubricant in pumping channel 288b from entering into channel 286b. Simultaneously, the width $W_a$ of pumping channel 286a increases as sidewall 284a moves away from sidewall 280a. The increasing of the width $W_a$ (and the associated cross-sectional area) of pumping channel 286a does not inhibit the flow of lubricant into or out of pumping channel 288a. With this rotation, pumping channels 288a can provide a greater pumping rate than channels 288b. As a result, a net positive pumping rate is achieved wherein pumping channels 288a pump captured lubricant back to lubricant side 26 at a faster rate than pumping channels 288b pump captured lubricant toward non-lubricant side 28.

Figure 11B:
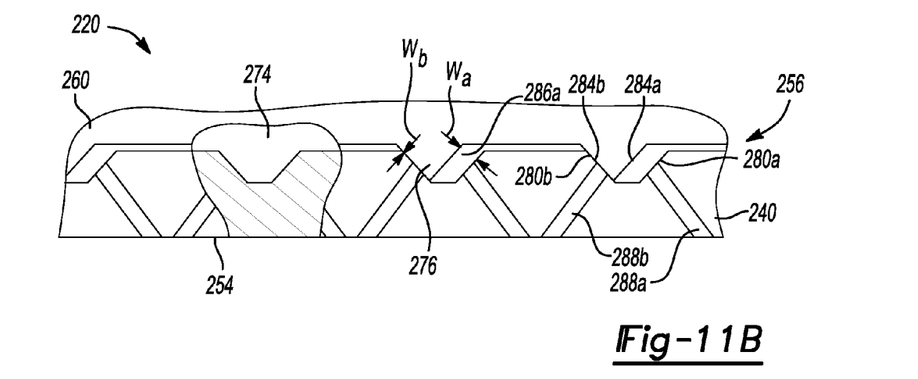

In some embodiments, as shown in FIG. 11B, it may be possible for valving portion 260 to move relative to active surface 240 a sufficient quantity such that sidewalls 284b contact sidewalls 280b and thereby block flow through channel 288b. When this is the case, the pumping rate of channels 288b is essentially reduced to zero, while the pumping rate through pumping channels 288a is maximized.

Figure 11C:
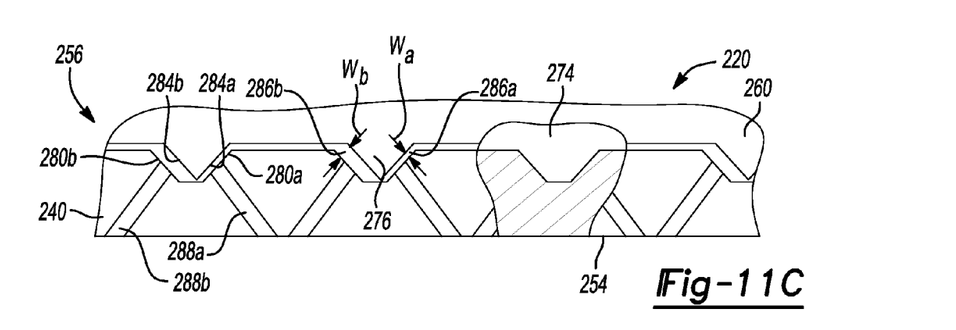
FIGS. 11C-D are fragmented views of the sealing and valve portions of the seal of FIG. 9 in a theoretical flattened condition showing relative movement between the sealing and valve portions of the seal for a second direction of shaft rotation.

When shaft 24 rotates in the second direction opposite to the first direction discussed above, valving portion 260 moves relative to active surface 240 in the other direction such that sidewalls 284a approach sidewalls 280a, as shown in FIG. 11C. In this direction of rotation, lubricant flow through pumping channels 288a is reduced due to the decrease in width $W_a$ (and the associated cross-sectional area) as sidewalls 284a approach sidewalls 280a. Simultaneously, the flow rate through pumping channels 288b can be the same or increase due to the increase in width $W_b$ (and the associated cross-sectional area) as sidewalls 284b move away from sidewalls 280b. As a result, a net positive pumping rate is achieved wherein channels 288b pump captured lubricant back to lubricant side 26 at a faster rate than pumping channels 288a pump captured lubricant toward non-lubricant side 28.

Figure 11D:
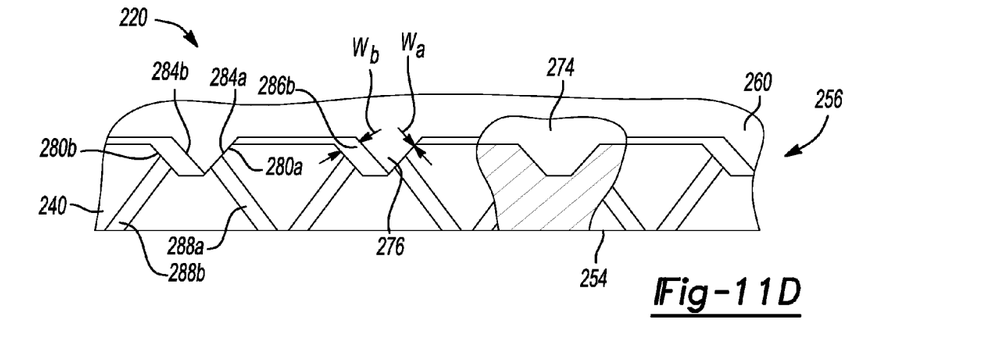

In some embodiments, as shown in FIG. 11D, valving portion 260 may move relative to active surface 240 a sufficient distance such that pumping channels 288a are closed off by sidewalls 284a contacting sidewalls 280a. When this is the case, the rate of pumping in pumping channels 288a is essentially zero, while pumping channels 288b is maximized.

Thus, in seal 220, pumping channels 288a, 288b can be restricted and/or sealed to provide a positive net pumping rate such that captured lubricant is pumped back to lubricant side 26 at a faster rate than is pumped toward non-lubricant side 28.

Figure 12:
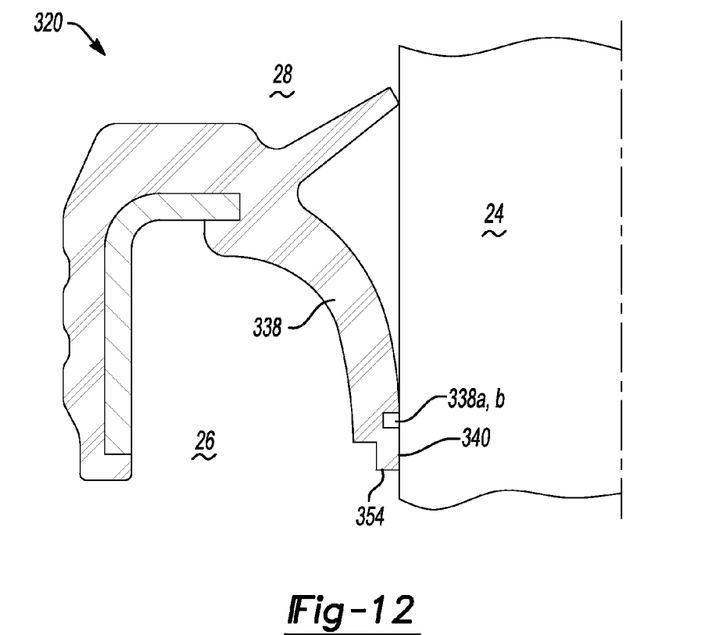
FIG. 12 is a cross-sectional view of a third embodiment of a seal in accordance with the present teachings on a shaft.
Figure 13:
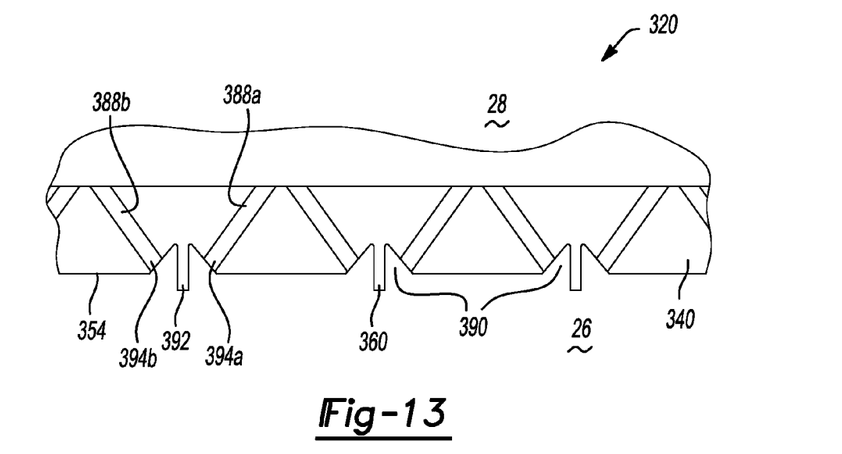
FIG. 13 is a fragmented view of a sealing portion and a valve portion of the seal of FIG. 12 in a theoretical flattened condition.

Referring now to FIGS. 12-14, a third embodiment of a seal 320 according to the present teachings is shown. Seal 320 is similar to seal 120 and 220 described above. Thus, only the differences will be described herein. In seal 320, valving portion 360 is an integral component of primary sealing portion 338. In particular, valving portion 360 is in the form of flexible fingers that deform during rotation of shaft 24 to restrict and/or block flow through either pumping channels 388a or pumping channels 388b depending upon the direction of rotation of shaft 24. Seal lip 354 includes a plurality of axially extending recesses 390, which can be generally triangular in shape. Pumping channels 388a, 388b extend from recesses 390 in respective first and second angular directions (orientations) along active surface 340. Fingers 392 extend from the center of recesses 390 toward lubricant side 26 and engage with shaft 24. Each finger 392 is between a pair of adjacent pumping channels 388a, 388b.

Figure 14A:
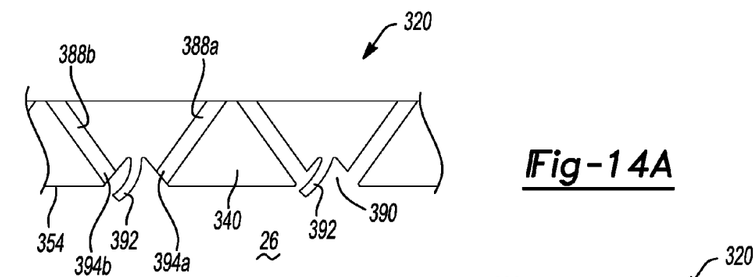
FIGS. 14A-B are fragmented views of the sealing and valve portions of the seal of FIG. 12 in a theoretical flattened condition showing relative movement between the sealing and valve portions of the seal for a first direction of shaft rotation.
Figure 14B:
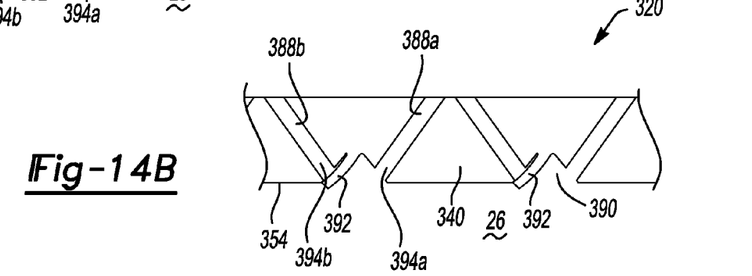

During rotation of shaft 24, fingers 392 deform/move relative to pumping channels 388a, 388b. In particular, as shown in FIG. 14A, when shaft 24 rotates in a first direction, fingers 392 move toward openings 394b, thereby impeding lubricant flow in pumping channel 388b. In some embodiments, fingers 392 may block openings 394b to pumping channels 388b, as shown in FIG. 14B. Movement of fingers 392 toward openings 394b restricts or prevents the flow of lubricant in pumping channels 388b while not interfering with the ability of pumping channels 388a to pump captured lubricant back to lubricant side 26. As a result, a net positive pumping rate can be achieved wherein pumping channels 388a are operable to pump lubricant to lubricant side 26 at a faster rate than pumping channels 388b are able to pump lubricant toward non-lubricant side 28.

Figure 14C:
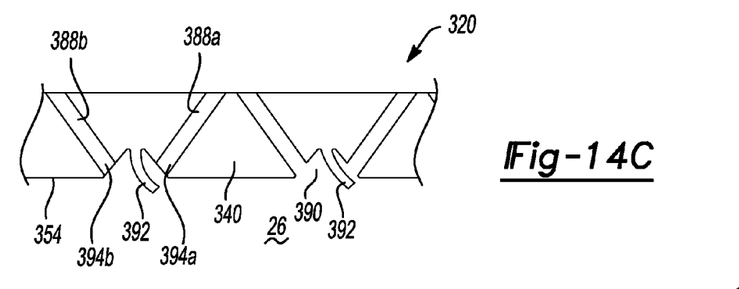
FIGS. 14C-D are fragmented views of the sealing and valve portions of the seal of FIG. 12 in a theoretical flattened condition showing relative movement between the sealing and valve portions of the seal for a second direction of shaft rotation.
Figure 14D:
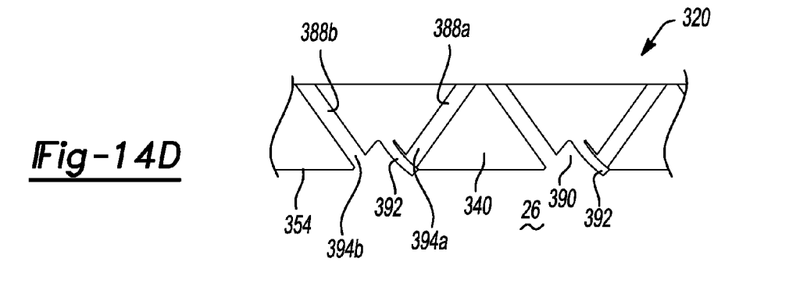

When shaft 24 rotates in a second direction opposite to the first direction, fingers 392 will deform/move toward openings 394a and restrict flow of lubricant in pumping channels 388a, as shown in FIG. 14C. In some embodiments, fingers 392 may block openings 394a to pumping channels 388a, as shown in FIG. 14D. Movement of fingers 392 toward openings 394a reduces or prevents lubricant from being pumped by pumping channels 388a toward non-lubricant side 28, while pumping channels 388b are unimpeded and able to pump lubricant toward lubricant side 26. As a result, a net positive pumping rate can be achieved with pumping channels 388b pumping lubricant toward lubricant side 26 at a greater rate than the ability of pumping channels 388a to pump lubricant toward non-lubricant side 28.

Thus, in seal 320, flexible fingers 392 are operable to restrict and/or block openings 394a, 394b to respective pumping channels 388a, 388b, depending upon the direction of rotation of shaft 24. As a result, one of the sets of pumping channels 388a, 388b can pump lubricant toward lubricant side 26 at a faster rate than the other set of pumping channels 388a, 388b can pump lubricant toward non-lubricant side 28. Accordingly, a positive net pumping rate can be achieved regardless of the direction of rotation of shaft 24.

Figure 15:
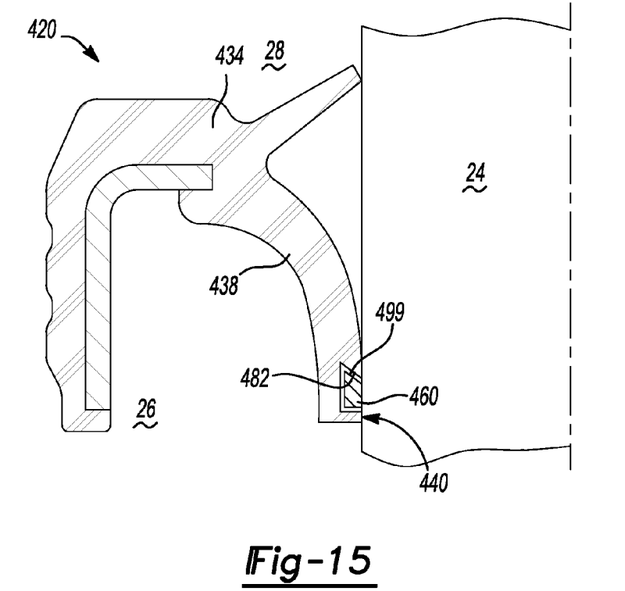
FIG. 15 is a cross-sectional view of a fourth embodiment of a seal in accordance with the present teachings.
Figure 16:
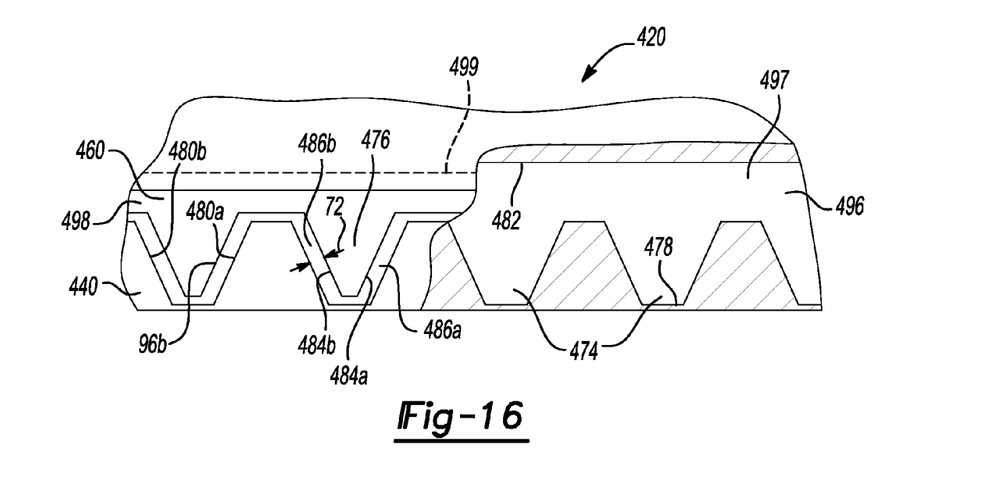
FIG. 16 is a fragmented view of a sealing portion and a valve portion of the seal of FIG. 15 in a theoretical flattened condition and having a cut-away section.

Referring now to FIGS. 15-16, a seal 420 according to a fourth embodiment in the present teachings is shown. Seal 420 is similar to seals 120, 220, 320 described above. As such, only the differences are described herein. In seal 420, valving portion 460 is a separate and discreet component that is not part of body 434. Rather, valving portion 460 is an annular flexible ring that is retained within primary sealing portion 438. Specifically, primary sealing portion 438 includes an active surface 440 with a recessed section 496 that extends radially the entire circumference of active surface 440. Recessed section 496 includes recesses 474 that each has a bottom 478 and sidewalls 480a, 480b. Recessed section 496 includes a continuous annular portion 497 that, in combination with recesses 474, receives valving portion 460.

Valving portion 460 includes an annular band section 498 from which teeth 476 extend. Band section 498 resides in annular portion 497 of active surface 440 with teeth 476 disposed in recesses 474. Annular portion 497 can include an undercut 482 that is complementary with a sloping top surface 499 of band section 498. Undercut 482 and sloping top surface 499 can facilitate retention of valving portion 460 in active surface 440 of primary sealing portion 438 when handling seal 420 and inserting the same around shaft 24. This enables valve portion 460 to be inserted into seal 420 prior to putting seal 420 into service. Additionally, this engagement reduces the chance of valving portion 460 from falling off of primary sealing portion 438 during handling of seal 420.

Valving portion 460 is operable to rotate relative to active surface 440 as a result of rotation of shaft 24. The relative rotation is limited by the engagement of sidewalls 484a, 484b with respective sidewalls 480a, 480b of recesses 474. The sidewalls 484a will move toward and/or engage with sidewalls 480a or sidewalls 484b will move toward and/or engage with sidewalls 480b, depending upon the direction of rotation of shaft 24. As a result of this relative movement, the widths $W_a$, $W_b$ (and the associated cross-sectional areas) of pumping channels 486a, 486b will change to alter the pumping rates of pumping channels 486a, 486b. Thus, when shaft 24 rotates in a first direction, sidewalls 484b can approach and/or contact sidewalls 480b, thereby reducing and/or eliminating lubricant flow through pumping channels 486b. Simultaneously, pumping channels 486a are enlarged, thereby facilitating the pumping of lubricant therethrough back into lubricant side 26. As a result, a positive net pumping rate can be achieved.

Similarly, when shaft 24 rotates in a second direction opposite the first direction, sidewalls 484a approach and/or contact sidewalls 480a, thereby reducing and/or eliminating lubricant flow through pumping channels 486a. As a result, the pumping rate of channels 486a is reduced and/or eliminated while the pumping rate of pumping channels 486b is increased. Accordingly, pumping channels 486b can pump lubricant back to lubricant side 26 at a faster rate than pumping channels 486a can pump lubricant toward non-lubricant side 28. As a result, a positive net pumping rate is achieved.

Thus, seal 420 can utilize a valving portion 460 that is distinct and separate from body 434 of seal 420. Valving portion 460 can move relative to active surface 440 to reduce/increase the size (and the associated cross-sectional area) of pumping channels 486a, 486b to advantageously allow a positive net pumping rate of lubricant back toward lubricant side 26 regardless of a direction of rotation of shaft 24.

The seals 120, 220, 320, 420 described herein can be made from a variety of materials. By way of non-limiting example, the materials can include elastomers, rubber, PTFE, TPV, and similar materials and combinations thereof.

While the seal according to the present teachings has been described with reference to specific examples and embodiments, it should be appreciated that these are merely exemplary and that changes and alterations can be made. For example, the various features of seals 120, 220, 320, 420 can be intermixed or interchanged with one another to provide a desired bi-directional pumping result. Furthermore, the specific orientation and configurations of the various pumping channels can vary from that shown. For example, the pumping channels can have a decreasing cross-sectional area, as the channels extend, to provide a preferential pressure increase along the pumping channels. For example, when the pumping channels do not extend through the seal lip, having the pumping channels reduce in cross-sectional area as they approach the seal lip can advantageously cause a pressure buildup to occur, thereby facilitating the captured and pumped lubricant disrupting the engagement of the seal lip with the shaft and allowing lubricant to flow back into lubricant side 26. Additionally, it should be appreciated that other sealing portions can be employed and/or it may be possible to eliminate a secondary sealing portion. Thus, the preceding description and illustrations are merely exemplary in nature and are not intended to limit the scope of the present teachings.

What is claimed is:

1. A bi-directional, dynamic seal comprising:
   a lubricant side;
   a non-lubricant side;
   a sealing portion having an active surface communicating with said non-lubricant side and operable to engage with a shaft;
   a plurality of pumping elements extending along said active surface, said pumping elements operable to capture lubricant and pump said captured lubricant to at least one of said lubricant side and said non-lubricant side due to relative rotation between said shaft and said pumping elements; and
   a valve portion displaceable relative to said active surface and operable to engage said shaft,
   wherein rotation of said shaft rotationally displaces said valve portion relative to said active surface such that said displaced valve portion changes a pumping rate of at least one of said pumping elements.

2. The seal of claim 1, wherein said plurality of pumping elements includes first and second sets of pumping elements, said first and second sets of pumping elements pump captured lubricant toward said lubricant side and said non-lubricant side, respectively, when said shaft rotates in a first direction, and said first and second sets of pumping elements pump captured lubricant toward said non-lubricant side and said lubricant side, respectively, when said shaft rotates in a second direction opposite said first direction.

3. The seal of claim 2, wherein said first set of pumping elements extend along said active surface at a first angular orientation, said second set of pumping elements extend along said active surface at a second angular orientation different than said first angular orientation.

4. The seal of claim 2, wherein displacement of said valve portion relative to said active surface reduces a pumping rate of said second set of pumping elements when said shaft rotates in said first direction and reduces a pumping rate of said first set of pumping elements when said shaft rotates in said second direction.

5. The seal of claim 4, wherein said pumping rate is reduced to substantially zero by said valve portion.

6. The seal of claim 4, wherein displacement of said valve portion relative to said active surface increases a pumping rate of said first set of pumping elements when said shaft rotates in said first direction and increases a pumping rate of said second set of pumping elements when said shaft rotates in said second direction.

7. The seal of claim 1, wherein said sealing portion includes at least one recess formed in said active surface and said at least one recess and said valve portion define said pumping elements.

8. The seal of claim 7, wherein said valve portion includes a plurality of projections that reside within said at least one recess thereby forming said plurality of pumping elements and said projections move relative to said at least one recess to change said pumping rate of at least one of said pumping elements.

9. The seal of claim 8, wherein said sealing portion includes a plurality of channels extending along said active surface between said lubricant side and said at least one recess and form a portion of said pumping elements, a first set of said channels extend along said active surface at a first angular orientation and a second set of said channels extend along said active surface at a second angular orientation different than said first angular orientation such that for either direction of rotation of said shaft, only one of said first and second sets of channels pumps captured lubricant toward said lubricant side.

10. The seal of claim 1, wherein said plurality of pumping elements includes a plurality of channels extending along said active surface and said valve portion includes a plurality of flexible projections that move relative to said channels due to rotation of said shaft, movement of said projections inhibiting flow in a first set of said channels when said shaft rotates in a first direction and movement of said projections inhibiting flow in a second set of said channels when said shaft rotates in a second direction different than said first direction, said first and second sets of channels being different from one another.

11. The seal of claim 1, wherein said sealing portion includes at least one recess and said valve portion includes an annular ring disposed in said at least one recess and operable to move within said at least one recess, and said annular ring and said at least one recess define said plurality of pumping elements.

12. A bi-directional, dynamic seal comprising:
an annular body having a lubricant side, a non-lubricant side, a central opening within which a shaft can be disposed, and a sealing portion having an active surface engaging with and sealing against the shaft disposed in said central opening;
a first set of pumping channels in said active surface operable to capture lubricant and pump captured lubricant toward said lubricant side when said shaft rotates in a first direction and toward said non-lubricant side when said shaft rotates in a second direction opposite to said first direction;
a second set of pumping channels in said active surface operable to capture lubricant and pump captured lubricant toward said non-lubricant side when said shaft rotates in said first direction and toward said lubricant side when said shaft rotates in said second direction; and
a valving member moveable relative to said active surface, said valving member inhibiting pumping of captured lubricant in said second set of channels when said shaft rotates in said first direction and inhibiting pumping of captured lubricant in said first set of channels when said shaft rotates in said second direction.

13. The seal of claim 12, wherein said active surface includes a plurality of recesses each having first and second side walls, said valving member includes a plurality of projections each having first and second side walls, said projections are disposed in said recesses with said first side walls facing one another and said second side walls facing one another, said first set of pumping channels are defined by said recesses, said projections and a first spacing between said facing first side walls, and said second set of pumping channels are defined by said recesses, said projections and a second spacing between said facing second side walls.

14. The seal of claim 13, wherein movement of said valving member relative to said active surface changes said first and second spacings.

15. The seal of claim 14, wherein a reduction in spacing between facing side walls inhibits pumping of captured lubricant in said set of channels defined by said facing side walls.

16. The seal of claim 13, wherein said projections are generally triangularly shaped projections.

17. The seal of claim 13, wherein said valving member is an annular band separate and distinct from said body and said annular band is disposed in said active surface and operable to move relative thereto.

18. The seal of claim 13, wherein said body includes first and second members extending radially inwardly therefrom and engaging said shaft, said first and second members are distinct and separate from one another, said first member includes said active surface and said second member is said valving member.

19. The seal of claim 12, wherein said active surface has a first rotational resistance, said valve member has a second rotational resistance less than said first rotational resistance such that said valve member has a larger rotational displacement than said active surface due to rotation of said shaft.

20. The seal of claim 12, further comprising:
a third set of pumping channels in said active surface and extending between said lubricant side to said first set of pumping channels, said third set of pumping channels operable to capture lubricant and pump captured lubricant toward said lubricant side when said shaft rotates in said first direction and toward said non-lubricant side when said shaft rotates in said second; and
a fourth set of pumping channels in said active surface and extending between said lubricant side to said second set of pumping channels, said fourth set of pumping channels operable to capture lubricant and pump captured lubricant toward said non-lubricant side when said shaft rotates in said first direction and toward said lubricant side when said shaft rotates in said second direction.

21. A method of capturing lubricant and directing it back to a lubricant side with a bi-directional seal, the method comprising:
capturing lubricant with pumping elements extending along an active surface of the seal;
pumping captured lubricant toward the lubricant side with a first set of the pumping elements when the shaft is rotating in a first direction;
pumping captured lubricant toward the lubricant side with a second set of the pumping elements when the shaft is rotating in a second direction different than the first direction, the second set of pumping elements being different than the first set;
reducing a pumping rate of the second set of pumping elements when the shaft is rotating in the first direction such that a pumping rate of the first set of pumping elements is greater than a pumping rate of the second set of pumping elements; and
reducing a pumping rate of the first set of pumping elements when the shaft rotates in the second direction such that a pumping rate of the second set of pumping elements is less than a pumping rate of the first set of pumping elements.

22. The method of claim 21, wherein reducing a pumping rate includes moving a valve member relative to the active surface.

23. The method of claim 22, wherein moving the valve member relative to the active surface includes changing a cross-sectional area of the pumping elements.

24. The method of claim 22, wherein reducing a pumping rate includes blocking the first and second sets of pumping elements with the valve member when the shaft rotates in the second and first directions, respectively.

25. The method of claim 21, further comprising increasing a pumping rate of the first set of pumping elements when the shaft rotates in the first direction and increasing a pumping rate of the second set of pumping elements when the shaft rotates in the second direction.

26. The method of claim 25, further comprising simultaneously increasing a pumping rate of one of the first and second sets of pumping elements and decreasing a pumping rate of the other one of the first and second sets of pumping elements.

27. The method of claim 26, wherein simultaneously increasing and decreasing pumping rates includes simultaneously changing a cross-sectional area of the first and second sets of pumping elements.

* * * * *